US012761968B2

(12) United States Patent
Son et al.

(10) Patent No.: US 12,761,968 B2

(45) Date of Patent: Oct. 13, 2026

(54) ELECTRONIC DEVICE AND OPERATION METHOD OF ELECTRONIC DEVICE

(71) Applicant: Samsung Electronics Co., Ltd., Suwon-si (KR)

(72) Inventors: Woonsang Son, Suwon-si (KR); Unsang Park, Suwon-si (KR); Kwangtaek Woo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 518 days.

(21) Appl. No.: 18/350,384

(22) Filed: Jul. 11, 2023

(65) Prior Publication Data

US 2023/0350730 A1 Nov. 2, 2023

Related U.S. Application Data

(63) Continuation of application No. PCT/KR2021/018485, filed on Dec. 7, 2021.

(30) Foreign Application Priority Data

Jan. 12, 2021 (KR) ........................ 10-2021-0003686

(51) Int. Cl.
*G06F 9/50* (2006.01)
*G06F 9/54* (2006.01)

(52) U.S. Cl.
CPC .............. *G06F 9/505* (2013.01); *G06F 9/542* (2013.01)

(58) Field of Classification Search
CPC .......... G06F 9/505; G06F 9/542; G06F 11/07; G06F 2209/5022; G06F 2209/508;
(Continued)

(56) References Cited

U.S. PATENT DOCUMENTS 7,480,719 B2 1/2009 Inoue
8,170,491 B2 5/2012 Shuman et al.
(Continued)

FOREIGN PATENT DOCUMENTS

CN 112131005 A 12/2020
JP 5428075 B2 2/2014
(Continued)

OTHER PUBLICATIONS

International Search Report dated Mar. 25, 2022, issued in International Patent Application No. PCT/KR2021/018485.
(Continued)

*Primary Examiner* — Peng Ke

(74) *Attorney, Agent, or Firm* — Jefferson IP Law, LLP

(57) ABSTRACT

An electronic device is provided. The electronic device includes a communication circuit, a memory, and at least one processor operatively connected to the communication circuit and the memory, wherein the memory stores instructions which, when executed, cause the processor to identify a delay event based on an occurrence of a delay situation in the electronic device, filter a parameter representing a state of the electronic device, determine a first score based on at least one of the identified delay event or the filtered parameter, determine a state level based on the determined first score, generate a hint corresponding to the state level, and control a resource of the electronic device based on the generated hint.

20 Claims, 9 Drawing Sheets

(58) Field of Classification Search
CPC ...... G06F 9/5027; G06F 11/30; G06F 9/5077; G06F 11/3055
See application file for complete search history.

(56) References Cited

U.S. PATENT DOCUMENTS

| | | | | |
|---|---|---|---|---|
| 8,386,611 | B2 | 2/2013 | Inoue | |
| 9,319,281 | B2 | 4/2016 | Yotsutani et al. | |
| 9,542,295 | B2 | 1/2017 | Lei et al. | |
| 11,216,352 | B2 | 1/2022 | Park | |
| 11,438,790 | B2 | 9/2022 | Gu et al. | |
| 2004/0205206 | A1 | 10/2004 | Naik | |
| 2007/0300061 | A1 | 12/2007 | Kim et al. | |
| 2008/0074375 | A1* | 3/2008 | Chu | G09G 3/3696 345/90 |
| 2008/0307245 | A1* | 12/2008 | Cesare | G06F 1/3296 713/340 |
| 2009/0249002 | A1* | 10/2009 | Imahara | G06F 11/3055 711/E12.001 |
| 2010/0268816 | A1 | 10/2010 | Tarui et al. | |
| 2013/0176348 | A1* | 7/2013 | Tsai | G09G 3/3614 345/209 |
| 2015/0020076 | A1 | 1/2015 | Lei et al. | |
| 2019/0018723 | A1* | 1/2019 | Maurer | G06F 11/0754 |
| 2019/0209806 | A1* | 7/2019 | Allen | H04L 12/2829 |
| 2022/0100556 | A1 | 3/2022 | Jo et al. | |

FOREIGN PATENT DOCUMENTS

| | | | |
|---|---|---|---|
| KR | 10-2006-0079244 | A | 7/2006 |
| KR | 10-0799302 | B1 | 1/2008 |
| KR | 10-0866857 | B1 | 11/2008 |
| KR | 10-2013-0114697 | A | 10/2013 |
| KR | 10-2014-0077769 | A | 6/2014 |
| KR | 10-1695013 | B1 | 1/2017 |
| KR | 10-1968575 | B2 | 8/2019 |
| KR | 10-2063093 | B1 | 1/2020 |
| KR | 10-2020-0022774 | A | 3/2020 |
| KR | 10-2020-0099306 | A | 8/2020 |
| WO | 2011/142031 | A1 | 11/2011 |

OTHER PUBLICATIONS

Korean Notice of Allowance with English translation dated Feb. 26, 2026; Korean Appln. No. 10-2021-0003686.

* cited by examiner

ELECTRONIC DEVICE AND OPERATION METHOD OF ELECTRONIC DEVICE

CROSS-REFERENCE TO RELATED APPLICATION(S)

This application is a continuation application, claiming priority under § 365(c), of an International application No. PCT/KR2021/018485, filed on Dec. 7, 2021, which is based on and claims the benefit of a Korean patent application number 10-2021-0003686, filed on Jan. 12, 2021, in the Korean Intellectual Property Office, the disclosure of which is incorporated by reference herein in its entirety.

BACKGROUND

1. Field

The disclosure relates to an electronic device and a method of operating the electronic device.

2. Description of Related Art

Recently, various electronic devices may cope with a bottleneck caused by a busy state of a system by allocating resources based on a scenario. The electronic device may allocate the same resource to the same scenario.

As technology develops and the number of applications used in electronic devices increases, bottleneck situations occur much more often in complex scenarios used by actual users.

Therefore, there is a need to provide a method capable of dynamically coping with this.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for relieving a system bottleneck.

Another aspect of the disclosure is to provide a method and device for dynamically allocating a system resource by dynamically identifying a busy state of an electronic device.

Another Aspects of the disclosure is to provide a method and device for dynamically allocating a system resource by dynamically identifying a system load situation caused by complex causes of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a memory, and at least one processor operatively connected to the communication circuit and the memory, wherein the memory stores instructions which, when executed, cause the processor to identify a delay event based on an occurrence of a delay situation in the electronic device, filter a parameter representing a state of the electronic device, determine a first score based on at least one of the identified delay event or the filtered parameter, determine a state level based on the determined first score, generate a hint corresponding to the state level, and control a resource of the electronic device based on the generated hint.

In accordance with another aspect of the disclosure, a method performed by an electronic device is provided. The method includes identifying a delay event based on an occurrence of a delay situation in the electronic device when a process for a memory included in or connected to the electronic device is executed, filtering a parameter representing a state of the electronic device, determining a first score based on at least one of the identified delay event or the filtered parameter, determining a state level based on the determined first score, generating a hint corresponding to the state level, and controlling a resource of the electronic device based on the generated hint.

According to the embodiments of the disclosure, it is possible to provide a method and device for dynamically corresponding to a bottleneck of an electronic device.

According to the embodiments of the disclosure, it is possible to provide a method and device that can dynamically grasp the busy state of an electronic device to allocate and release system resources, thereby dynamically improving/optimizing the bottleneck of an electronic device.

According to the embodiments of the disclosure, it is possible to provide a method and device that can dynamically grasp a system load situation caused by complex causes of an electronic device, thereby releasing the bottleneck of the electronic device caused by the load condition.

According to the embodiments of the disclosure, it is possible to provide a method and device that can dynamically allocate resources required for a system, thereby eliminating the bottleneck and providing smooth user experience (UX) to users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
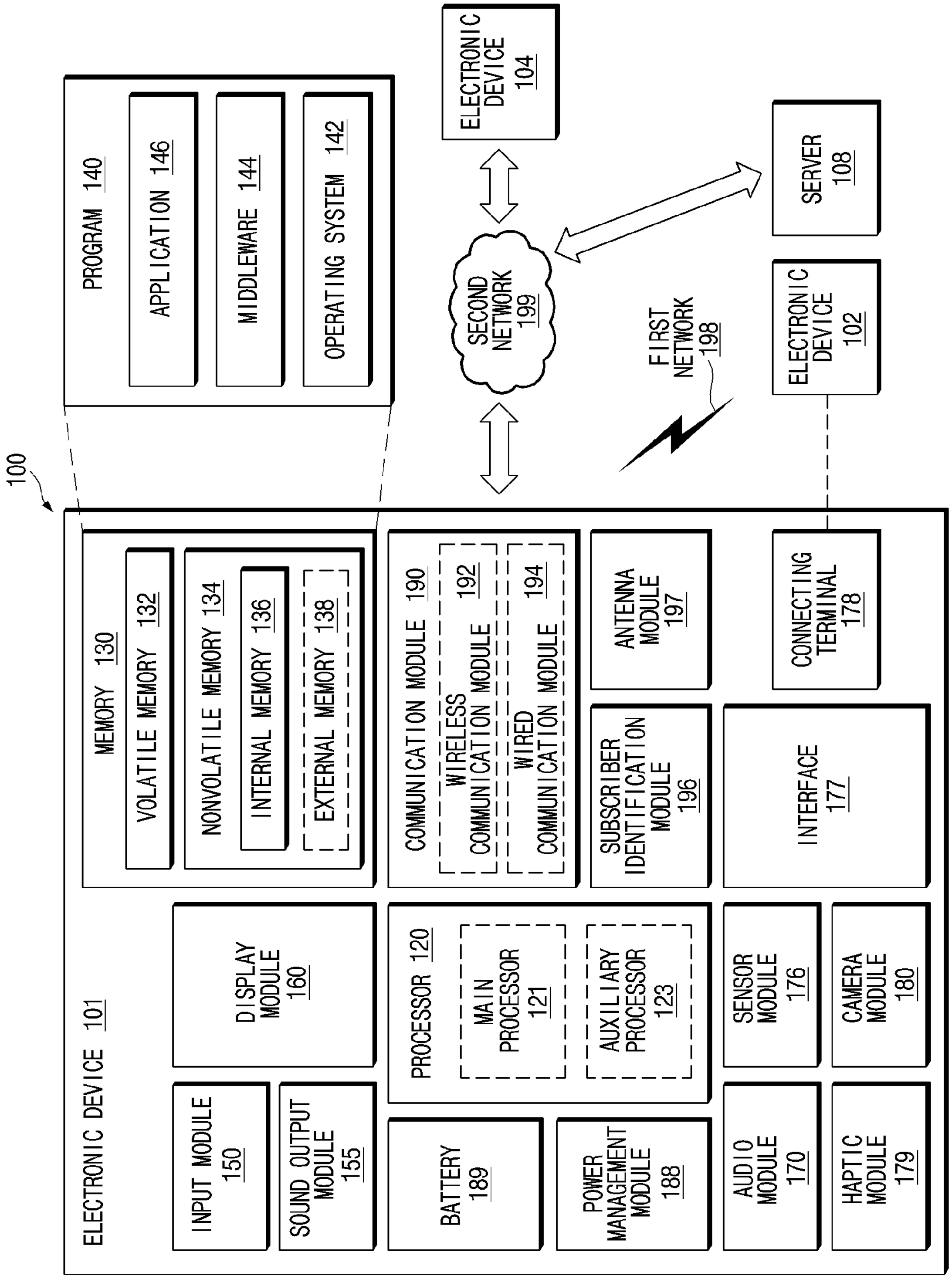
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device (i.e., the electronic device 104) via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (i.e., electronic devices 102 or 104, or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device (i.e., the electronic device 104) may include an internet-of-things (IoT) device. The server 108 may be an intelligent server using machine learning and/or a neural network. According to an embodiment, the external electronic device (i.e., the electronic device 104) or the server 108 may be included in the second network 199. The electronic device 101 may be applied to intelligent services (e.g., smart home, smart city, smart car, or healthcare) based on 5G communication technology or IoT-related technology.

Figure 2:
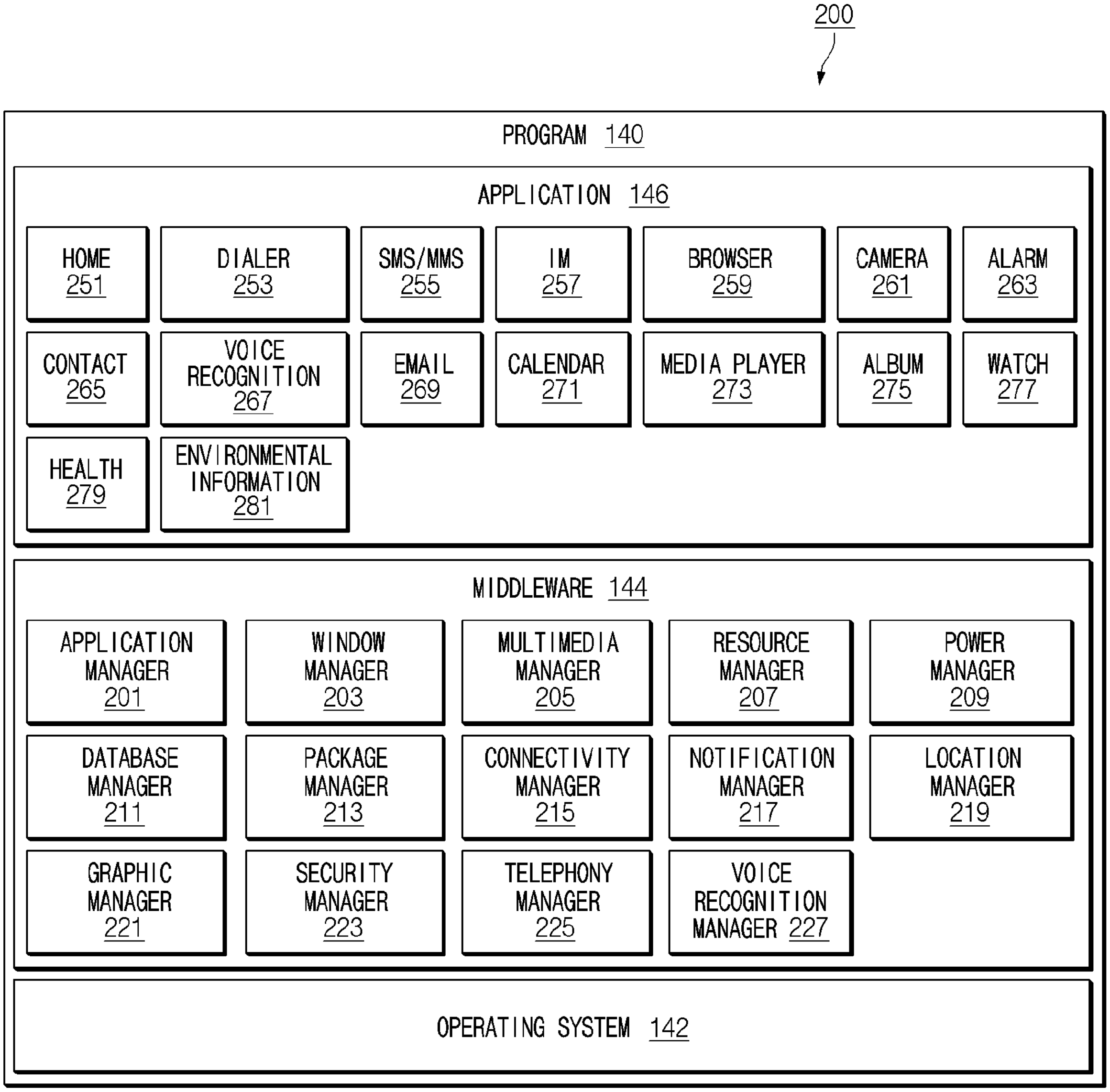
FIG. 2 is a block diagram illustrating a program according to an embodiment of the disclosure.

FIG. 2 is a block diagram illustrating a program according to an embodiment of the disclosure.

Figure 3:
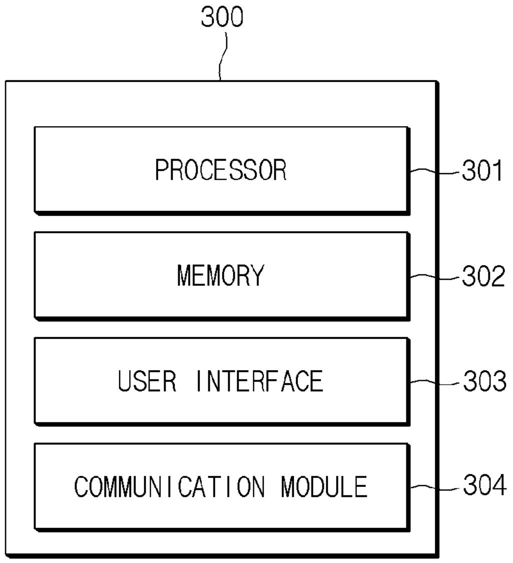
FIG. 3 is a block diagram illustrating the structure of an electronic device according to an embodiment of the disclosure.

Referring to FIG. 3, as depicted in block diagram 200, the program 140 may include an operating system (OS) 142 to control one or more resources of the electronic device 101, middleware 144, or an application 146 executable in the OS 142. The OS 142 may include, for example, Android™, iOS™, Windows™, Symbian™ Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email application 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

FIG. 3 is a block diagram illustrating the structure of an electronic device according to an embodiment of the disclosure. For clarity of description, overlapping items described above may be simplified or omitted.

Referring to FIG. 3, an electronic device 300 may include a processor 301 (e.g., a processor 120 of FIG. 1), a memory 302 (e.g., a memory 130 of FIG. 1), a user interface 303, and a communication module 304 (e.g., a communication module 190 of FIG. 1). The user interface 303 may include a microphone (not shown) (e.g., the input module 150 of FIG. 1) and a speaker (not shown) (e.g., the sound output module 155 of FIG. 1).

The electronic device 300 may include at least one additional component in addition to the components shown in FIG. 3. According to an embodiment, the components of the electronic device 300 may be the same entity or constitute separate entities.

For example, the electronic device 300 may include a smart phone, a tablet, a wearable device, a home appliance, or a digital camera. According to an embodiment, the processor 301 may be operatively coupled to the communication module 304, the memory 302, the user interface 303 (the microphone (not shown) and the speaker (not shown)) to perform overall functions of the electronic device 300. For example, the processor 301 may include one or more processors. For example, the one or more processors may include an image signal processor (ISP), an application processor (AP), or a communication processor (CP).

Figure 4:
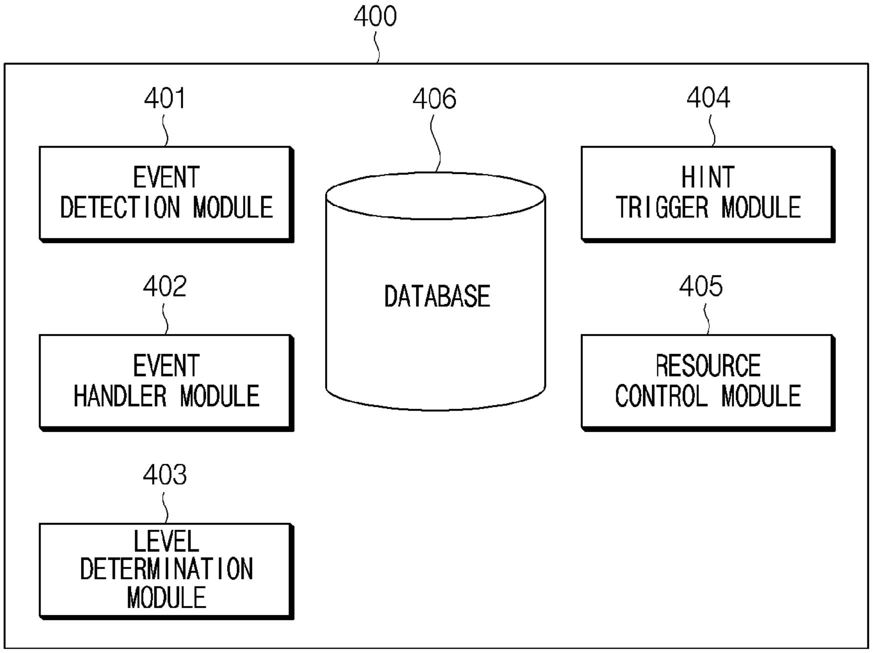
FIG. 4 is another block diagram illustrating the structure of an electronic device according to an embodiment of the disclosure.

In addition, the processor 301 may execute the instructions stored in the memory 302 to drive modules (e.g., an event detection module 401, an event handler module 402, a level determination module 403, a hint trigger module 404, a resource control module 405, a database 406, and a process control module 407 in FIG. 4).

The processor 301 may be operatively coupled to modules (e.g., the event detection module 401, the event handler module 402, the level determination module 403, the hint trigger module 404, the resource control module 405, the database 406, and the process control module 407 in FIG. 4) in order to perform the overall functions of the electronic device 300. In the embodiments of the disclosure, it may be understood that the operations performed (or executed) by the modules (e.g., the event detection module 401, the event handler module 402, the level determination module 403, the hint trigger module 404, the resource control module 405, the database 406, and the process control module 407 in FIG. 4) are the operations performed by executing the instructions stored in the memory 302 by the processor 301.

In an embodiment, the processor 301 may include modules (e.g., the event detection module 401, the event handler module 402, the level determination module 403, the hint trigger module 404, the resource control module 405, the database 406, and the process control module 407 in FIG. 4). In this case, the operations performed (or executed) by each module (e.g., the event detection module 401, the event handler module 402, the level determination module 403, the hint trigger module 404, the resource control module 405, the database 406, and the process control module 407 in FIG. 4) may be implemented by at least a part of the processor 301.

Several modules mentioned in various embodiments of the disclosure may be implemented in hardware or software.

The memory 302 may store a database (not shown) including at least one piece of input data (e.g., the database 406 of FIG. 4). The memory 302 may store commands, information, or data related to operations of components included in the electronic device 300. For example, the memory 302 may store instructions that, when executed, cause the processor 301 to perform various operations described herein.

In an embodiment, the electronic device 300 may receive a user input by using the user interface 303. The user input may be an input for a user to execute an app. In an embodiment, the user input may be a voice input (e.g., speech) of a user. When the user input is a voice input, the electronic device 300 may receive the user input through a microphone (or a voice receiving device) (not shown). In an embodiment, the user input may be a touch input and/or a gesture input of a user. When the user input is a touch input and/or a gesture input, the electronic device 300 may receive the user input through a sensor (not shown).

In an embodiment, at least one of the operations of each component described with reference to the electronic device 300 may be performed (or executed) by an external server (not shown) or another electronic device (not shown). For example, the processor 301 may transmit a user input to an external server (not shown) or another electronic device (not shown) by using the communication module 304.

The processor 301 may include at least one or more processors, and may be physically divided into a main processor performing high-performance processing and an auxiliary processor performing low-power processing. Alternatively, one processor may switch between high performance and low power for processing according to circumstances.

In an embodiment, the processor 301 may identify a delay event. The processor 301 may detect a delay situation, generate a delay event corresponding to the delay situation, and identify the generated event. The delay situation may refer to a situation that may cause a bottleneck of the system. For example, the delay situation may mean at least one of a system main looper delay, a service lock contention, and/or an input framework delay.

In an embodiment, the processor 301 may determine whether the delay event is greater than or equal to a threshold value. The threshold value may mean a threshold that generates a bottleneck in the system of the electronic device 300. For example, when the delay event is less than or equal to the threshold value, the electronic device 300 may ignore the delay event.

The delay event may mean a delay time value due to a bottleneck.

In an embodiment, the processor 301 may determine whether a liquid crystal display (LCD) state, a resource limitation state, and/or pressure stall info (PSI) of the electronic device 300 exceed a threshold value.

In an embodiment, the processor 301 may determine a bottleneck score. In an embodiment, the processor 301 may determine the bottleneck score by measuring the delay event during a window of a specified time interval.

In an embodiment, the processor 301 may detect the system main looper delay, the service lock contention and/or the input framework delay sensed during the window of the specified time interval to measure the delay event and determine the bottleneck score based on the delay event.

In an embodiment, the processor 301 may determine the bottleneck window score. In an embodiment, the processor 301 may calculate the determined bottleneck score with a state score according to the LCD state, the resource limitation state, and/or the pressure stall info (PSI) to determine the bottleneck window score.

In an embodiment, the processor 301 may determine a state level. In an embodiment, the processor 301 may determine the state level based on the determined bottleneck window score.

In an embodiment, the processor 301 may determine whether the determined state level is equal to the current state level. When the determined state level is not equal to the current state level, the processor 301 may generate a hint corresponding to the determined state level.

In an embodiment, the processor 301 may generate a hint for resource control corresponding to the state level. The hint may mean information about the transitioned state level.

In an embodiment, the processor 301 may control a resource corresponding to the hint. The processor 301 may secure resources by controlling the system of the processor 301 corresponding to the hint.

In an embodiment, the processor 301 may boost and release the limit on a clock included in or operatively connected to the processor 301 corresponding to the hint.

In an embodiment, the processor 301 may preemptively secure a memory included in or operatively connected to the processor 301 corresponding to the hint. The processor 301 predicts the bottleneck of the electronic device 300 and dynamically allocates resources required for the system, thereby solving the bottleneck and providing a smooth UX to the user of the electronic device 300.

In an embodiment, the processor 301 may limit a background process included in or operatively connected to the processor 301 corresponding to the hint. For example, the processor 301 may freeze and limit the background process other than the entering app.

In an embodiment, the processor 301 may determine an app having interaction with the user of the processor 301 corresponding to the hint as a top priority app, and reduce a race condition with the background process to the maximum to guarantee the operation of the top-priority app even in a bottleneck state.

Hereinafter, the operation of the processor 301 will be described in detail.

In an embodiment, the processor 301 may identify a delay event based on an occurrence of a delay situation in the electronic device, filter a parameter representing a state of the electronic device, determine a first score based on at least one of the identified delay event or the filtered parameter, determine a state level based on the determined first score, generate a hint corresponding to the state level, and control a resource of the electronic device based on the generated hint.

In an embodiment, the processor 301 may determine the first score for a set unit of time based on a number of events generated during the set unit of time.

In an embodiment, the parameter may include at least one of the delay event, an operating state of an LCD included in or operatively connected to the electronic device, a resource limitation state, or pressure stall info (PSI).

In an embodiment, the processor 301 may ignore the generated delay event in response to an off state of an LCD included in or operatively connected to the electronic device.

In an embodiment, the delay situation may include at least one of the delay event, the main looper delay of a system included in or operatively connected to the electronic device, the service lock contention, or the input framework delay.

In an embodiment, the processor 301 may determine whether the parameter exceeds a threshold value, and filter the parameter determining the first score in response to the parameter exceeding the threshold.

In an embodiment, the processor 301 may determine a second score based on the generated delay event, determine a third score based on at least one of filtered parameters, and determine the first score by calculating the second score and the third score.

In an embodiment, the processor 301 may perform a calculation by giving a weight of at least one of the second score or the third score.

In an embodiment, the processor 301 may generate the hint in response to a difference between the determined state level and a current state level.

In an embodiment, the processor 301 may determine whether a level difference between the determined state level and the current state level is greater than or equal to a specified level, and generate the hint in response to that the level difference is equal to or greater than the specified level.

FIG. 4 is a block diagram illustrating the structure of an electronic device according to an embodiment of the disclosure. For clarity of description, overlapping items described above may be simplified or omitted.

Referring to FIG. 4, an electronic device 400 may include the event detection module 401, the event handler module 402, the level determination module 403, the hint trigger module 404, the resource control module 405, the database 406. The listed components may be operatively or electrically connected to each other.

The event detection module 401 may detect a delay situation of the electronic device 400, generate a delay event corresponding to the delay situation, and identify the generated delay event. The delay situation may refer to a situation that may cause a bottleneck of the system. For example, the delay situation may mean at least one of a system main looper delay, a service lock contention, and/or an input framework delay. The event detection module 401 may transmit the generated delay event to the event handler module 402.

In an embodiment, the event detection module 401 may transmit the generated delay event to the event handler module 402 in the form of a library.

In an embodiment, the event detection module 401 may transmit the delay event to the event handler module 402 through a socket connection. The socket connection may refer to a standard connection scheme for network communication.

The event handler module 402 may filter and transmit parameters for determining the level of the bottleneck to the level determination module 403. The bottleneck may refer to a system bottleneck that may cause a user of the electronic device 400 to feel that the operation of the electronic device 400 slows down or stops.

In an embodiment, the parameter may include the delay event, LCD state, resource limitation state, and/or pressure stall info (PSI) transmitted from the event detection module 401. The LCD state may refer to whether the LCD of the electronic device 400 is in an off state.

In an embodiment, because the event handler module 402 does not require user interaction of the electronic device 400 when the LCD of the electronic device 400 is in an off state, the event handler module 402 may ignore a bottleneck phenomenon even when a critical path operation becomes longer.

The resource limitation state may refer to a state in which the electronic device 400 restricts use of system resources to reduce battery consumption.

For example, the resource limitation state may refer to a state in which the electronic device 400 restricts use of system resources to reduce battery consumption when heat generation of the electronic device 400 is too high.

For example, the resource limitation state may refer to a state in which the electronic device 400 restricts use of system resources to reduce battery consumption when the electronic device 400 is set into the battery limitation mode.

The pressure stall info (PSI) may refer to information about a busy level of resources of the electronic device 400. For example, the PSI may refer to information about a resource busy state of a CPU, memory, and/or input/output (I/O) included in or operatively connected to the electronic device 400.

In an embodiment, the event handler module 402 may determine whether the delay event, the LCD state, the resource limitation state, and/or the pressure stall info (PSI) exceed a threshold value. The threshold value may refer to a threshold that generates a bottleneck in the system of the electronic device 400.

In an embodiment, the event handler module 402 may determine priorities for the delay event, the LCD state, the resource limitation state, and/or the pressure stall info (PSI). The priority may refer to an order determined by the electronic device 400 according to the need to process the event. For example, as the degree of exceeding the threshold value increases, the electronic device 400 may need to process the event first, so the event may have a higher priority.

The level determination module 403 may calculate a bottleneck window score during a window and determine a state level based on the bottleneck window score. The window may refer to one of sections into which a section is divided by a preset constant time.

In an embodiment, the level determination module 403 may determine the bottleneck score of the corresponding window by calculating the delay event during the window of a specified time interval. The level determination module 403 may calculate the determined bottleneck score with a state score according to the LCD state, the resource limitation state, and/or the pressure stall info (PSI) to determine the bottleneck window score.

The level determination module 403 may determine the state level based on the determined bottleneck window score. The level determination module 403 may transition a level according to the determined state level.

The hint trigger module 404 may detect a state level transition and determine whether the state level transition is higher than or equal to a specified level. The hint trigger module 404 may transmit the hint to the resource control module 405 when the transitioned state level is higher than or equal to a specified level. The hint may refer to information about the transitioned state level.

The hint trigger module 404 may transmit the hint to the resource control module 405, so that it is possible to quickly secure necessary resources according to the state level transition.

The resource control module 405 may secure resources by controlling the system of the electronic device 400 corresponding to the hint. In an embodiment, the resource control module 405 may boost the clock and release the limit corresponding to the hint.

In an embodiment, the resource control module 405 may preemptively secure a memory corresponding to the hint.

In an embodiment, the resource control module 405 may limit a background process. For example, the resource control module 405 may freeze and limit the background process other than the entering app.

In an embodiment, the resource control module 405 may determine an app having interaction with the user of the electronic device 400 as a top priority app, and reduce a race condition with the background process to the maximum to guarantee the operation of the top-priority app even in a bottleneck state.

Hereinafter, a method performed by the electronic device 101 according to an embodiment of the disclosure will be described with reference to FIGS. 5 and 6.

Figure 5:
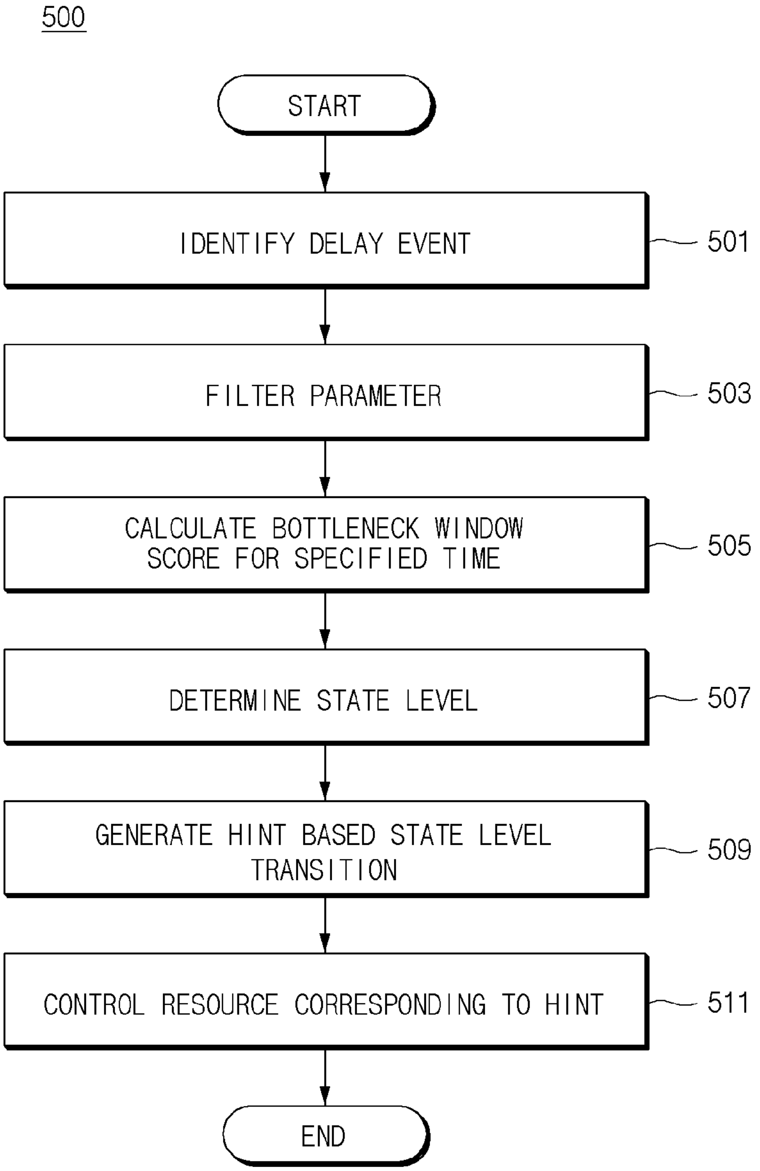
FIG. 5 is one flowchart illustrating a method of improving a system bottleneck by providing a hint by an electronic device according to an embodiment of the disclosure.

FIG. 5 is a flowchart illustrating a method of controlling a resource by providing a hint by the electronic device 101 according to an embodiment of the disclosure. According to an embodiment, it may be understood that the process shown in flowchart 500 of FIG. 5 is performed by a processor (e.g., the processor 120 of FIG. 1) of an electronic device (e.g., the electronic device 101 of FIG. 1) executing the instructions stored in a memory (e.g., the memory 130 of FIG. 1).

Referring to FIG. 5, in operation 501, the electronic device 101 may detect a delay situation, generate a delay event corresponding to the delay situation, and identify the generated delay event. The delay situation may refer to a situation that may cause a bottleneck of the system. For example, the delay situation may mean at least one of a system main looper delay, a service lock contention, and/or an input framework delay.

In operation 503, the electronic device 101 may filter a parameter. The parameter may include the generated delay event, the LCD state, the resource limitation state, and/or the pressure stall info (PSI).

In an embodiment, because the electronic device 101 does not require user interaction of the electronic device 101 when the LCD included in or operatively connected to the electronic device 101 is in an off state, the electronic device 101 may filter and ignore a bottleneck phenomenon even when a critical path operation becomes longer.

In an embodiment, the electronic device 101 may determine whether the delay event, the LCD state, the resource limitation state, and/or the pressure stall info (PSI) exceed a threshold value. The threshold value may refer to a threshold that generates a bottleneck in the system of the electronic device 101.

In an embodiment, the electronic device 101 may determine priorities for the delay event, the LCD state, the resource limitation state, and/or the pressure stall info (PSI). The priority may refer to an order determined by the electronic device 101 according to the need to process the event. For example, as the degree of exceeding the threshold value increases, the electronic device 101 may need to process the event first, so the event may have a higher priority.

In operation 505, the electronic device 101 may calculate a bottleneck window score during a specified time. In an embodiment, the electronic device 101 may determine the bottleneck score based on the delay event and calculate the state score according to the LCD state, the resource limitation state, and/or the pressure stall info (PSI) to determine the bottleneck window score. This will be described in detail with reference to FIGS. 7 to 8.

In operation 507, the electronic device 101 may determine the state level. In an embodiment, the electronic device 101 may determine the state level based on the determined bottleneck window score. In an embodiment, the electronic device 101 may transition the level according to the determined state level.

In operation 509, the electronic device 101 may generate a hint based on the state level transition. In an embodiment, the electronic device 101 may detect a state level transition and generate a hint for resource control. The hint may refer to information about the transitioned state level.

In operation 511, the electronic device 101 may control a resource corresponding to the hint. The electronic device 101 may secure resources by controlling the system of the electronic device 400 corresponding to the hint.

In an embodiment, the electronic device 101 may boost the clock and release the limit the clock included in or operatively connected to the electronic device 101 corresponding to the hint.

In an embodiment, the electronic device 101 may preemptively secure the memory included in or operatively connected to the electronic device 101 corresponding to the hint.

In an embodiment, the electronic device 101 may limit the background process included in or operatively connected to the electronic device 101. For example, the electronic device 101 may freeze and limit the background process other than the entering app.

In an embodiment, the electronic device 101 may determine an app having interaction with the user of the electronic device 101 as a top priority app, and reduce a race condition with the background process to the maximum to guarantee the operation of the top-priority app even in a bottleneck state.

Although FIG. 5 illustrates that the electronic device 101 sequentially performs operations 501 to 511, this may be changed so that some of the operations are performed by the electronic device 101 and others are performed by an external device. For example, operation 501 may be performed in an electronic device and operations 503 to 511 may be performed in a server.

Figure 6:
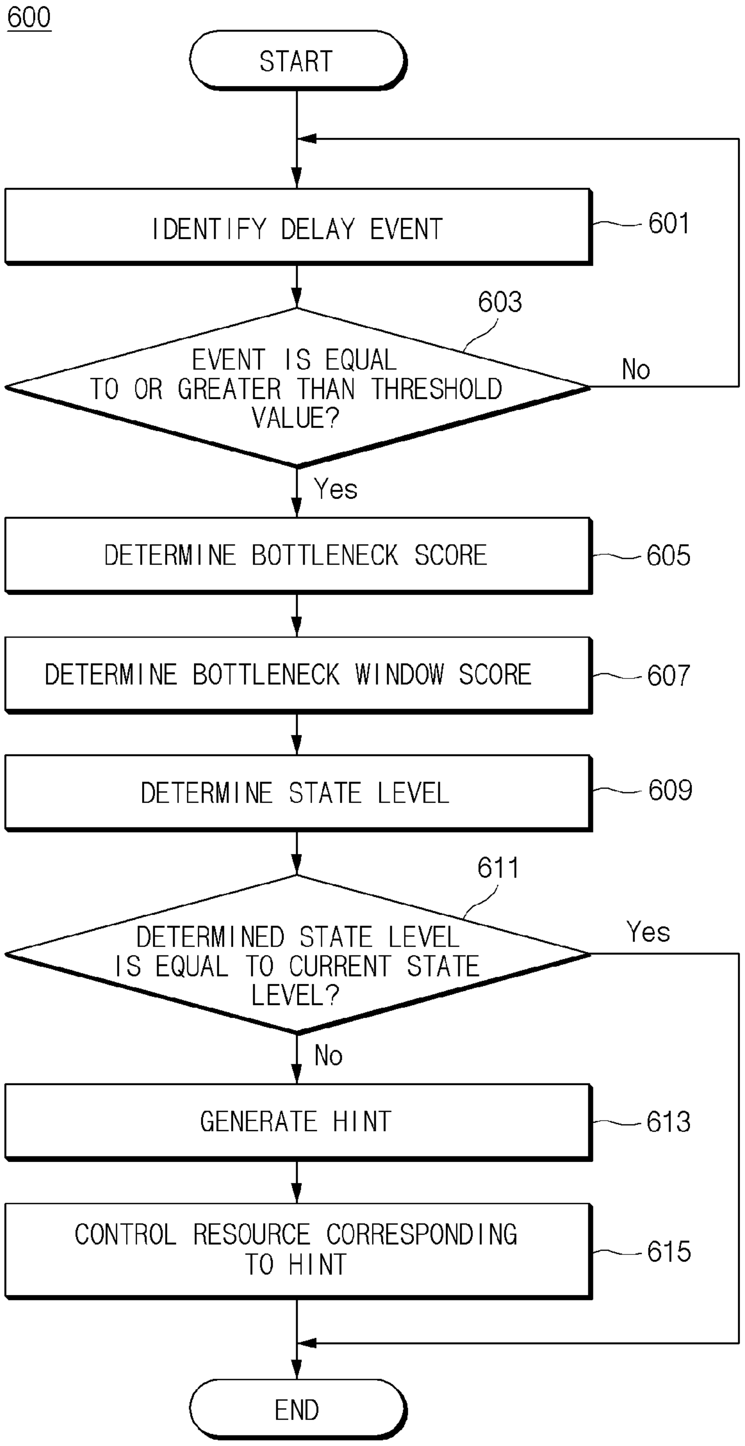
FIG. 6 is another flowchart illustrating a method of improving a system bottleneck by providing a hint by an electronic device according to an embodiment of the disclosure.

FIG. 6 is a flowchart illustrating a method of controlling a resource by providing a hint by an electronic device according to an embodiment of the disclosure.

Referring to FIG. 6, it may be understood that the process shown in flowchart 600 of FIG. 6 is performed by a processor (e.g., the processor 120 of FIG. 1) of an electronic device (e.g., the electronic device 101 of FIG. 1) executing the instructions stored in a memory (e.g., the memory 130 of FIG. 1).

In operation 601, the electronic device 101 may identify a delay event. The electronic device 101 may detect a delay situation, generate a delay event corresponding to the delay situation, and identify the generated delay event. The delay situation may refer to a situation that may cause a bottleneck of the system. For example, the delay situation may mean at least one of a system main looper delay, a service lock contention, and/or an input framework delay.

In operation 603, the electronic device 101 may determine whether the delay event exceeds a threshold value. The threshold value may refer to a threshold that generates a bottleneck in the system of the electronic device 101. In an embodiment, the electronic device 101 may also determine whether the LCD state, the resource limitation state, and/or the pressure stall info (PSI) exceed a threshold value.

When it is determined that the delay event exceeds the threshold, the electronic device 101 may perform operation 605. To the contrary, when the delay event is not greater than or equal to the threshold value, the electronic device 101 may perform operation 601.

In operation 605, the electronic device 101 may determine a bottleneck score. In an embodiment, the electronic device 101 may determine the bottleneck score by measuring the delay event during a window of a specified time interval. In an embodiment, the electronic device 101 may detect the main looper delay, the service lock contention and/or the input framework delay sensed during the window of the specified time interval to measure the delay event and determine the bottleneck score based on the delay event.

In operation 607, the electronic device 101 may determine the bottleneck window score. In an embodiment, the electronic device 101 may calculate the determined bottleneck score with a state score according to the LCD state, the resource limitation state, and/or the pressure stall info (PSI) to determine the bottleneck window score.

In operation 609, the electronic device 101 may determine a state level. In an embodiment, the electronic device 101 may determine the state level based on the determined bottleneck window score.

In an operation 611, the electronic device 101 may determine whether the determined state level is equal to the current state level. When the determined state level is equal to the current state level, the electronic device 101 may end the process. To the contrary, when the determined state level is not equal to the current state level, the electronic device 101 may perform operation 613.

In operation 613, the electronic device 101 may generate a hint corresponding to the determined state level. In an embodiment, the electronic device 101 may generate a hint for resource control corresponding to the state level. The hint may refer to information about the transitioned state level.

In operation 615, the electronic device 101 may control the resource corresponding to the hint. The electronic device 101 may secure resources by controlling the system of the processor 301 corresponding to the hint.

In an embodiment, the electronic device 101 may boost and release the limit on a clock included in or operatively connected to the electronic device 101 corresponding to the hint.

In an embodiment, the electronic device 101 may pre-emptively secure a memory included in or operatively connected to the electronic device 101 corresponding to the hint.

In an embodiment, the electronic device 101 may limit a background process included in or operatively connected to the electronic device 101 corresponding to the hint. For example, the electronic device 101 may freeze and limit the background process other than the entering app.

In an embodiment, the electronic device 101 may determine an app having interaction with the user of the electronic device 101 corresponding to the hint as a top priority app, and reduce a race condition with the background process to the maximum to guarantee the operation of the top-priority app even in a bottleneck state.

Although FIG. 6 illustrates that the electronic device 101 sequentially performs operations 601 to 615, this may be changed so that some of the operations are performed by the electronic device 101 and others are performed by an external device. For example, operation 601 may be performed in an electronic device and operations 603 to 615 may be performed in a server.

In an embodiment, a method performed by the electronic device 101 may include identifying a delay event based on an occurrence of a delay situation in the electronic device when a process for a memory included in or connected to the electronic device is executed, filtering a parameter representing a state of the electronic device, determining a first score based on at least one of the identified delay event or the filtered parameter, determining a state level based on the determined first score, generating a hint corresponding to the state level, and controlling a resource of the electronic device based on the generated hint.

In an embodiment, a method performed by the electronic device 101 may further include determining the first score for a set unit of time based on a number of events generated during the set unit of time.

In an embodiment, the parameter may include at least one of the delay event, an operating state of an LCD included in or operatively connected to the electronic device, a resource limitation state, or pressure stall info (PSI).

In an embodiment, a method performed by the electronic device 101 may further include ignoring the generated delay event in response to an off state of an LCD included in or operatively connected to the electronic device.

In an embodiment, the delay situation may include at least one of the delay event, a main looper delay of a system included in or operatively connected to the electronic device, a service lock contention, or an input framework delay.

In an embodiment, a method performed by the electronic device 101 may further include determining whether the parameter exceeds a threshold value, and filtering the parameter determining the first score in response to the parameter exceeding the threshold.

In an embodiment, a method performed by the electronic device 101 may further include determining a second score based on the generated delay event, determining a third score based on at least one of filtered parameters, and determining the first score by calculating the second score and the third score.

In an embodiment, a method performed by the electronic device 101 may further include performing a calculation by giving a weight to at least one of the second score or the third score.

In an embodiment, a method performed by the electronic device 101 may further include generating the hint in response to a difference between the determined state level and a current state level.

In an embodiment, a method performed by the electronic device 101 may further include determining whether a level difference between the determined state level and the current state level is greater than or equal to a specified level, and generating the hint in response to that the level difference is equal to or greater than the specified level.

Hereinafter, with reference to the diagrams shown in FIGS. 7 and 8, a method of determining a bottleneck window score by the electronic device 101 using a delay event according to an embodiment will be described in detail.

Figure 7:
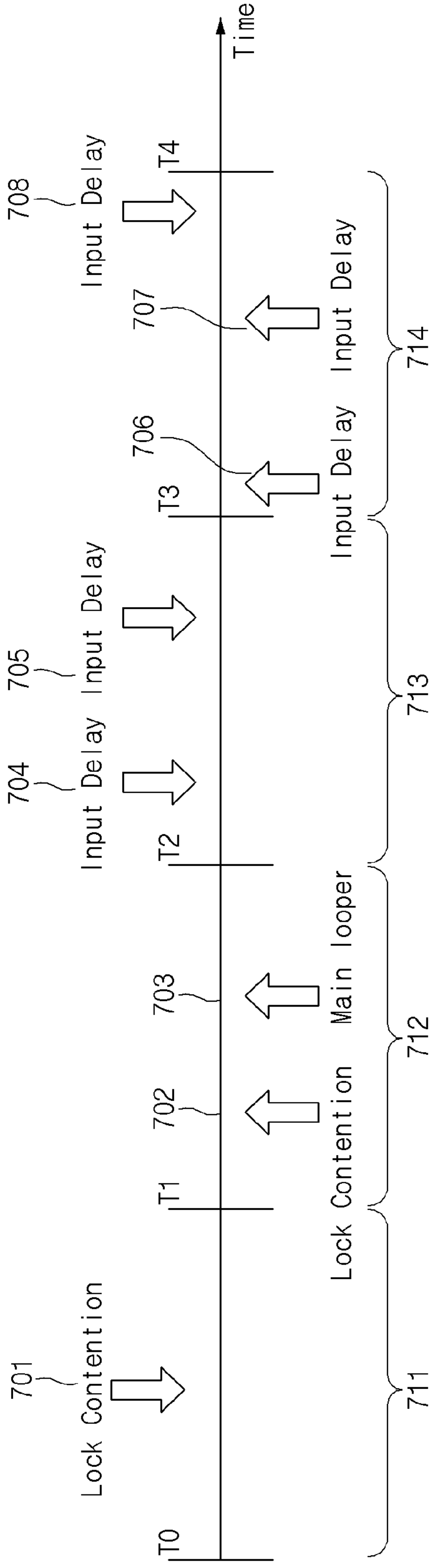
FIG. 7 is a diagram illustrating an example of a delay event generated by an electronic device according to an embodiment of the disclosure.

FIG. 7 is a diagram illustrating an example of a delay event generated by an electronic device according to an embodiment of the disclosure.

Referring to FIG. 7, a delay event 703 generated by a system main looper delay, delay events 701 and 702 generated by a service lock contention, and delay events 704, 705, 706, 707 and 708 generated by an input framework delay contention are shown.

FIG. 7 illustrates windows divided by a specified time. In detail, a first window 711 from T0 to T1, a second window 712 from T1 to T2, a third window 713 from T2 to T3, and a fourth window 714 from T3 to T4 are shown.

In the first window 711, the delay event 701 due to a service lock contention is generated. In the second window 712, the delay event 702 due to the service lock contention and the delay event 703 due to a system main looper delay are generated. In the third window 713, the two delay events 704 and 705 are generated by two input framework delays. In the fourth window 714, three delay events 706, 707 and 708 are generated by three input framework delays.

Figure 8:
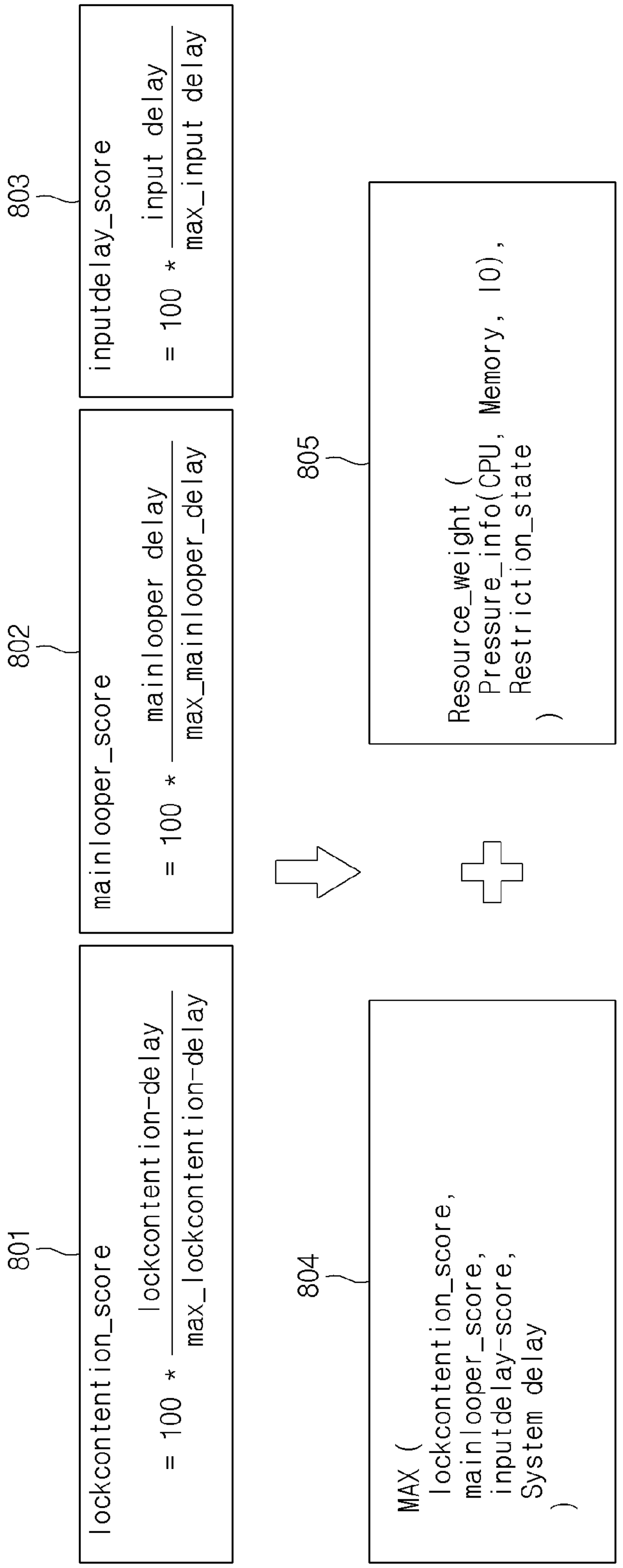
FIG. 8 is a diagram illustrating an example of a method of calculating a bottleneck window score by an electronic device according to an embodiment of the disclosure.

FIG. 8 is a diagram illustrating an example of a method of calculating a bottleneck window score by an electronic device according to an embodiment of the disclosure.

Referring to FIG. 8, an electronic device 101 may calculate scores for generated delay events by dividing them according to the cause of each delay event. In detail, a score 801 for a delay event generated by service lock contention, a score 802 for a delay event generated by a system main looper delay, and an input framework score 803 for a delay event generated by an input framework delay contention may be calculated, respectively.

Referring to FIG. 8, the electronic device 101 may determine a bottleneck score 804 based on the scores 801, 802 and 803 calculated, respectively.

The electronic device 101 may determine a bottleneck window score by calculating a resultant value 805 obtained by weighting the parameter value indicating the state to the bottleneck score 804. The parameter indicating the state may include an LCD state included in or operatively connected to the electronic device 101, a resource limitation state included in or operably connected to the electronic device 101, and/or pressure stall info (PSI). The LCD state may refer to whether the LCD of the electronic device 400 is in an off state.

Figure 9:
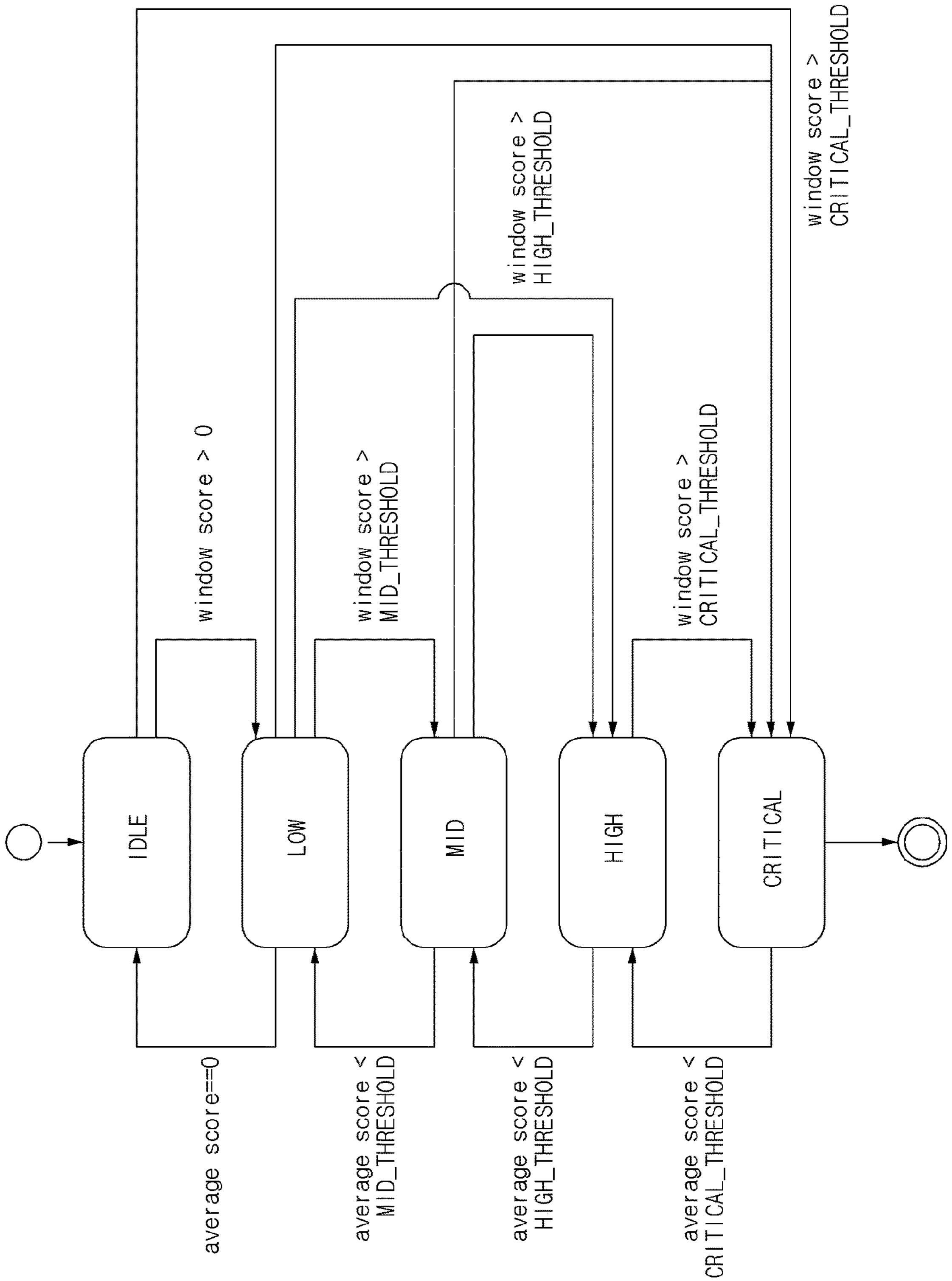
FIG. 9 is diagram illustrating a method of improving a system bottleneck by providing a hint by an electronic device according to an embodiment of the disclosure.

FIG. 9 is diagram illustrating a method of improving a system bottleneck by providing a hint by an electronic device according to an embodiment of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuit;

a memory storing instructions; and at least one processor operatively connected to the communication circuit and the memory, wherein the instructions, when executed by the at least one processor individually or collectively, cause the electronic device to:

identify at least one delay event based on occurrence of respective at least one delay situation in the electronic device, the at least one delay situation each being one among a plurality of different specified types of delay situations that are each capable of causing bottleneck of the electronic device, determine at least one bottleneck score respectively for the identified at least one delay event, filter at least one parameter representing respective at least one state of the electronic device, each of the at least one state being a different specified type of state of the electronic device, determine a bottleneck window score for a specified time interval, based on one or more of the at least one bottleneck score respectively for one or more of the at least one delay event identified during the specified time interval, and based on the filtered at least one parameter, determine a bottleneck state level of the electronic device, based on the determined bottleneck window score, generate a hint for resource control corresponding to the bottleneck state level of the electronic device, and control at least one resource of the electronic device, based on the generated hint for resource control.

2. The electronic device of claim 1, wherein the instructions, when executed by the at least one processor individually or collectively, further cause the electronic device to:

determine the bottleneck window score for the specified time interval, based on a number of the one or more of the at least one delay event identified during the specified time interval.

3. The electronic device of claim 1, wherein the at least one parameter includes at least one of the delay event, an operating state of a liquid crystal display (LCD) included in or operatively connected to the electronic device, a resource limitation state, or pressure stall info (PSI).

4. The electronic device of claim 1, wherein the instructions, when executed by the at least one processor individually or collectively, further cause the electronic device to:

ignore at least one of the identified at least one delay event, in response to an off state of a liquid crystal display (LCD) included in or operatively connected to the electronic device.

5. The electronic device of claim 1, wherein the at least one delay situation includes at least one of the delay event, a main looper delay of a system included in or operatively connected to the electronic device, a service lock contention, or an input framework delay.

6. The electronic device of claim 1, wherein the instructions, when executed by the at least one processor individually or collectively, further cause the electronic device to:

determine whether the at least one parameter exceeds a threshold value, and filter the at least one parameter based on which the bottleneck window score is determined, in response to the at least one parameter exceeding the threshold value.

7. The electronic device of claim 1, wherein the instructions, when executed by the at least one processor individually or collectively, further cause the electronic device to:

determine a second score based on the one or more of the at least one bottleneck score, determine a third score based on the filtered at least one parameter, and determine, as the bottleneck window score, a first score by calculating the second score and the third score.

8. The electronic device of claim 7, wherein the instructions, when executed by the at least one processor individually or collectively, further cause the electronic device to:

perform the calculation by giving a weight of at least one of the second score or the third score.

9. The electronic device of claim 1, wherein the instructions, when executed by the at least one processor individually or collectively, further cause the electronic device to:

generate the hint for resource control, in response to a difference between the determined bottleneck state level of the electronic device and a current bottleneck state level of the electronic device.

10. The electronic device of claim 9, wherein the instructions, when executed by the at least one processor individually or collectively, further cause the electronic device to:

determine whether a level difference between the determined bottleneck state level of the electronic device and the current bottleneck state level of the electronic device is greater than or equal to a specified level, and generate the hint for resource control, in response to the level difference being equal to or greater than the specified level.

11. A method performed by an electronic device, the method comprising:

identifying, using at least one processor of the electronic device, at least one delay event based on occurrence of respective at least one delay situation in the electronic device when a process for a memory included in or connected to the electronic device is executed, the at least one delay situation each being one among a plurality of different specified types of delay situations that are each capable of causing bottleneck of the electronic device;

determining at least one bottleneck score respectively for the identified at least one delay event;

filtering at least one parameter representing respective at least one state of the electronic device, each of the at least one state being a different specified type of state of the electronic device;

determining, using the at least one processor, a bottleneck window score for a specified time interval, based on one or more of the at least one bottleneck score respectively for one or more of the at least one delay event identified during the specified time interval, and based on the filtered at least one parameter;

determining a bottleneck state level of the electronic device, based on the determined bottleneck window score;

generating a hint for resource control corresponding to the bottleneck state level of the electronic device; and controlling at least one resource of the electronic device, based on the generated hint for resource control.

12. The method of claim 11, further comprising:

determining the bottleneck window score for the specified time interval, based on a number of the one or more of the at least one delay event identified during the specified time interval.

13. The method of claim 11, wherein the at least one parameter includes at least one of the delay event, an operating state of a liquid crystal display (LCD) included in or operatively connected to the electronic device, a resource limitation state, or pressure stall info (PSI).

14. The method of claim 11, further comprising:

ignoring at least one of the identified at least one delay event, in response to an off state of a liquid crystal display (LCD) included in or operatively connected to the electronic device.

15. The method of claim 11, wherein the at least one delay situation includes at least one of the delay event, a main looper delay of a system included in or operatively connected to the electronic device, a service lock contention, or an input framework delay.

16. The method of claim 11, further comprising:

determining whether the at least one parameter exceeds a threshold value; and filtering the at least one parameter based on which the bottleneck window score is determined, in response to the at least one parameter exceeding the threshold value.

17. The method of claim 11, further comprising:

determining a second score based on the one or more of the at least one bottleneck score;

determining a third score based on the filtered at least one parameter; and determining, as the bottleneck window score, a first score by calculating the second score and the third score.

18. The method of claim 17, further comprising:

performing the calculation by giving a weight to at least one of the second score or the third score.

19. The method of claim 11, generating the hint for resource control, in response to a difference between the determined bottleneck state level of the electronic device and a current bottleneck state level of the electronic device.

20. The method of claim 19, further comprising:

determining whether a level difference between the determined bottleneck state level of the electronic device and the current bottleneck state level of the electronic device is greater than or equal to a specified level; and generating the hint for resource control, in response to the level difference being equal to or greater than the specified level.

* * * * *